Nov. 27, 1951  P. B. BERLIEN  2,576,664
TWIST DRILL
Filed Dec. 2, 1949
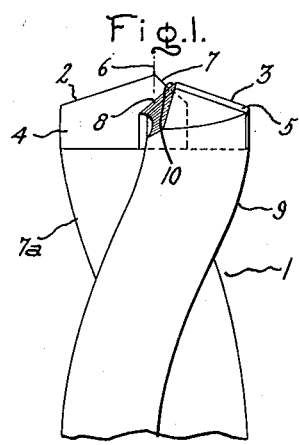
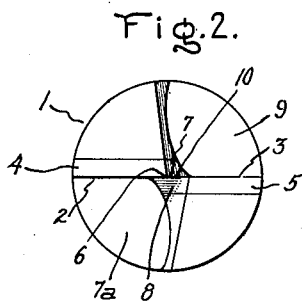
Inventor:
Paul B. Berlien,
by Ernest C. Britton
His Attorney.

Patented Nov. 27, 1951

2,576,664

UNITED STATES PATENT OFFICE 2,576,664

TWIST DRILL

Paul B. Berlien, Fort Wayne, Ind., assignor to General Electric Company, a corporation of New York Application December 2, 1949, Serial No. 130,717

3 Claims. (Cl. 77—70)

1

This invention relates to twist drills, and in particular to a new and improved design of a point for a twist drill.

Conventional twist drills are usually provided with a pair of straight edged cutting lips of equal length extending to the web of the drill to form a point at what is known as dead center. Excessive heat is usually produced at the dead center of the drill in view of the fact that there is little or no cutting action and instead an axial pressure at the point is produced as the drill is forced through the material being cut. The excessive pressure and heat usually results in a broken or chipped drill after relatively few passes through hard material. The dead center pressure also requires that a greater horsepower be used to rotate the drill and a greater pressure be used axially on the drill.

Attempts have been made to use high speed twist drills with cutting lips of a so-called hard metal alloy, such as tungsten carbide, for drilling metal, but they have not been wholly successful due to a tendency of the brittle alloy to chip or the drill to fail at the web.

Efforts have been made to overcome the difficulties in this respect by varying the design of the cutting lip formed on inserts of alloys, and although they have been somewhat successful, there is still need in the trade for an improved high speed cutting drill.

It is an object of this invention to provide a new and improved point for a twist drill.

It is a further object of this invention to provide a twist drill which may be operated efficiently at low axial pressure.

A still further object of this invention is to provide a new and improved point for twist drill which may be operated at high cutting speed and which needs no center drilling or punch holes and which may be operated on flat or rough surfaces.

A still further object of this invention is to provide a twist drill which will drill a hole sufficiently accurate and smooth to eliminate a major portion of the reaming operation, thereby effecting in screw machine work a material reduction in cycle time.

Further objects and advantages of this invention will become apparent and the invention will be better understood from the following description referring to the accompanying drawing, and the features of novelty which characterize this invention will be pointed out with particularity in the claims annexed to and forming a part of this specification.

Broadly, this invention comprises an improved structure of cutting lips for twist drills having sintered carbide inserts brazed to the cutting extremities of the drill flutes. One of the inserts extends past dead center, while the cutting lip thereon terminates at dead center; the dead center includes an angle of greater than 90 degrees.

A second insert provides a cutting lip that does not extend to dead center; consequently, a notch is formed that is displaced from the longitudinal center line of the drill.

In the drawing, Fig. 1 is a front view of one embodiment of the improved point for a twist drill; while Fig. 2 is an end view of the improved point for a twist drill.

Referring to the drawing, a drill 1 is provided with cutting lips 2 and 3. Lips 2, 3, as shown, are formed on inserts 4, 5 of a so-called hard metal alloy of which sintered carbides of certain elements such as tungsten and cobalt are examples. Inserts 4, 5 are fastened to the drill in any suitable manner, as by brazing. These inserts are preferably of uniform thickness throughout, a feature which gives added strength and durability to the cutting lip with less chance of over-strain and breakage of the cutting edges of cutting lips.

While the drawing shows only a pair of cutting lips, it is to be understood that this is merely a preferred embodiment, and any number of cutting lips may be used having any suitable shape; that is, although the lips shown in Fig. 1 and Fig. 2 are radially extending toward the center, they may have any contour, so long as they meet the following requirements.

Inserts 4 and 5 extend radially inwardly from the periphery of the drill. Each insert is longer than the radius of the drill; consequently, there is an overlapping at the longitudinal center line. Insert 4, for example, extends from the outer surface of flute 7a, to which it is secured, inwardly beyond the longitudinal center line, and includes dead center 6. Cutting lip 2, which is formed on insert 4, extends to dead center, while a receding portion 7 of insert 4 continues beyond dead center.

Insert 5 is secured to flute 9, and while it may be equal in length to insert 4, cutting lip 3, which is formed on it, is not as long as lip 2. Lip 3 does not extend inwardly as far as dead center 6. Receding portion 8 of insert 5 provides a smooth surface to prevent the blocking of chips and, in addition, it strengthens the inner point of cutting lip 3.

The angle of cutting lip 3 with the longitudinal center line of the drill is equal to the angle made by cutting lip 2, but the angle of cutting lip 3 with the longitudinal center line is greater than the angle made by portion 7 with the longitudinal center line. The difference in angle between portion 7 and cutting lip 3 forms a notch 10 having its greatest depth at the point where the planes of portions 7 and 8 intersect. This notch aids in splitting of chips and in preventing the clogging of metal immediately beneath the dead center of the drill. In addition, by using the notch, less axial pressure and horsepower are required for the drilling operation.

By utilization of the extended portion 7 of insert 4, and by maintaining the angle that cutting lip 2 makes with the extended portion 7 greater than 90 degrees, a much stronger dead center point 6 is formed than if the deep portion of the notch were immediately adjacent the longitudinal center line of the drill.

The angles that cutting lips 2 and 3 make with a horizontal line passing through dead center point 6 may be varied, depending on the type of material to be drilled, but it has been found very satisfactory to use an angle of 10 degrees between each of the lips 2 and 3 and a horizontal line passing through dead center 6.

The flute angles are also variable, depending on the type material to be drilled, but it has been found that an 8 degree flute angle for steel and a 16 degree flute angle for copper have proven to be very satisfactory.

This new and improved tip for twist drills has given very satisfactory results and after trails and tests, lasting over a period of months, these drills show no wear or breakdown at the point.

With the use of this new and improved point for a twist drill, the axial operating pressure has been considerably reduced and even at fast drilling speeds there has been no chipping or breaking of the point.

Modifications of this invention will occur to those skilled in the art and it is desired to be understood, therefore, that this invention is not to be limited to the particular arrangement disclosed, but that the appended claims are meant to cover all the modifications which do not depart from the spirit and scope of this invention.

What I claim as new and desire to secure by Letters Patent of the United States is:

1. A high speed twist drill having a pair of flutes each provided at its cutting extremity with a sintered carbide insert, each of said inserts comprising a cutting lip and a receding portion, the first of said inserts extending inwardly from the periphery of said drill beyond the longitudinal center line thereof, the cutting lip and receding portion on said first insert including a dead center angle of greater than 90 degrees, the second of said inserts extending inwardly from the periphery of said drill to provide a cutting lip that terminates short of the longitudinal center line thereof, the inner ends of each of said cutting lips being joined by their respective receding portions to form a notch displaced from the longitudinal center line of said drill.

2. A high speed twist drill having a pair of flutes each provided at its cutting extremity with a sintered carbide insert, each of said inserts comprising a cutting lip and a receding portion, the first of said inserts extending inwardly from the periphery of said drill beyond the longitudinal center line thereof, the cutting lip on said first insert terminating at dead center, the second of said inserts extending inwardly from the periphery of said drill to provide a cutting lip that terminates short of the longitudinal center line thereof, the inner ends of each of said cutting lips being joined by their respective receding portions to form a notch having its deepest portion adjacent said second cutting lip and displaced from the longitudinal center line of said drill.

3. A high speed twist drill having a pair of flutes each provided at its cutting extremity with a sintered carbide insert, each of said inserts provided at its cutting extremity with a cutting lip and a receding portion, each of said cutting lips being formed at equal angles with the longitudinal center line of the drill, each of said recessed portions being formed at an angle less than that of said cutting lips, the first of said inserts extending radially inwardly from the periphery of said drill beyond the longitudinal center line thereof, the cutting lip on said first insert extending radially inwardly from the periphery of said drill to the longitudinal center line thereof, said cutting lip and the receding portion on said first insert including a dead center angle of greater than 90 degrees, the second of said inserts extending radially inwardly from the periphery of said drill to provide a cutting lip that terminates short of the longitudinal center line thereof, the inner ends of each of said cutting lips being joined by their respective receding portions, the difference in angle between said cutting lips and said receding portions forming a notch having its deepest portion displaced from the longitudinal center line of said drill.

PAUL B. BERLIEN.

REFERENCES CITED

The following references are of record in the file of this patent:

UNITED STATES PATENTS

| Number | Name | Date |
|---|---|---|
| 984,323 | Vauclain | Feb. 14, 1911 |

FOREIGN PATENTS

| Number | Country | Date |
|---|---|---|
| 154,242 | Germany | Dec. 20, 1903 |
| 520,213 | Great Britain | Apr. 17, 1940 |